US005736113A

United States Patent [19]

Hazen et al.

[11] Patent Number: 5,736,113

[45] Date of Patent: Apr. 7, 1998

[54] METHOD FOR BENEFICIATION OF TRONA

[75] Inventors: Wayne C. Hazen, Denver; Roland Schmidt, Lakewood; Dale Lee Denham, Jr., Louisville, all of Colo.

[73] Assignee: Environmental Projects, Inc., Casper, Wyo.

[21] Appl. No.: 583,879

[22] Filed: Jan. 11, 1996

[51] Int. Cl.$^{6}$ .......................... C01D 11/00; C22B 26/10; B03C 7/00

[52] U.S. Cl. ...................................... 423/206.2; 209/127.2

[58] Field of Search .............................. 423/206.2; 209/9, 209/127.2

[56] References Cited

U.S. PATENT DOCUMENTS

| | | | |
|---|---|---|---|
| 3,655,331 | 4/1972 | Seglin et al. | 423/206.2 |
| 3,802,556 | 4/1974 | Fricke et al. | 209/9 |
| 3,835,996 | 9/1974 | Singewald et al. | 209/9 |
| 4,341,744 | 7/1982 | Brison et al. | 423/206.2 |
| 4,375,454 | 3/1983 | Imperto et al. | 423/206.2 |
| 4,512,879 | 4/1985 | Attia et al. | 209/3 |
| 4,943,368 | 7/1990 | Gilbert et al. | 209/2 |
| 5,470,554 | 11/1995 | Schmidt et al. | 423/206.2 |

OTHER PUBLICATIONS

Perry, Chilton and Kirkpatrick, "Electrostatic Separation", Chemical Engineers Handbook, 4th Ed. (1963), pp. 21–67 to 21–70, no month.

*Primary Examiner*—Steven Bos
*Attorney, Agent, or Firm*—Sheridan Ross P.C.

[57] ABSTRACT

Disclosed is a method for beneficiating trona from a feed-stream containing trona and impurities by a dry separation method, namely, electrostatically separating a first portion of impurities from the trona at a temperature between about 25° C. and about 45° C. The disclosed beneficiation of trona method may also include separation of impurities from trona by other dry separation methods, such as density separation, magnetic separation and size separation, and/or by wet separation methods.

26 Claims, No Drawings

METHOD FOR BENEFICIATION OF TRONA

FIELD OF THE INVENTION

The present invention relates generally to the beneficiation of sodium carbonate and, more particularly, trona.

BACKGROUND OF THE INVENTION

Many saline minerals are recognized as being commercially valuable. For example, trona, borates, potash and sodium chloride are mined commercially. After mining, these minerals typically need to be beneficiated to remove naturally occurring impurities.

With regard to trona ($Na_2CO_3.NaHCO_3.2H_2O$), trona is commonly used to make soda ash, which is used in the production of glass and paper. Naturally-occurring trona, or crude trona, is found in large deposits in the western United States, such as in Wyoming and California, and also in Egypt, Kenya, Botswana, Tibet, Venezuela and Turkey. Crude trona ore from Wyoming is typically between about 80% and about 90% trona, with the remaining components including shortite, halite, quartz, dolomite, mudstone, oil shale, kerogen, mica, nahcolite and clay minerals.

The glass and paper making industries generally require soda ash produced from trona having a purity of 99% or more. In order to obtain such a high purity, wet beneficiation processes have been used. Such processes generally involve crushing the crude trona, solubilizing the trona, treating the solution to remove insolubles and organic matter, crystallizing the trona, and drying the trona which may subsequently be calcined to produce soda ash. Alternatively, the crude trona can be calcined to yield crude sodium carbonate, which is then solubilized, treated to remove impurities, crystallized and dried to produce sodium carbonate monohydrate.

Not all industries which use trona require such a highly purified form of trona. For example, certain grades of glass can be produced using trona having less than 97% purity. For this purpose, U.S. Pat. No. 4,341,744 discloses a dry beneficiation process which is less complex and less expensive than the above-described wet beneficiation process. Such a dry beneficiation process generally includes crushing the crude trona, classifying the trona by particle size, electrostatically separating certain impurities, and optionally magnetically separating other impurities. Such a process can yield trona having up to about 95% to 97% purity, depending on the quantity and type of impurities present in the crude trona ore.

There are uses for trona, for example, in certain applications in the glass industry, requiring a purity of at least 97%, yet not needing a purity over 99%. The known dry beneficiation processes typically do not consistently produce such a purity. Consequently, these industries generally use soda ash purified by the more expensive and complex wet beneficiation processes.

Commonly-assigned U.S. Patent application Ser. No. 08/066,871, filed May 25, 1993, now U.S. Pat No. 5,470,554, which is incorporated herein by reference in its entirety, discloses a dry process for beneficiating saline minerals and which achieves purities on the order of about 97% or more. The disclosed process significantly enhances the saline mineral recovery process by producing a low cost, high purity product. However, dry processes may have difficulty in producing higher purities due to the problem of processing fines and/or removing interstitial impurities by a dry process.

Accordingly, it is an object of the present invention to provide a process for the beneficiation of saline minerals and in particular, trona, resulting in higher purities than existing dry beneficiation processes and which is simpler and less expensive than known wet beneficiation processes. It is another object of the present invention to provide an enhanced wet beneficiation process which has advantages over known wet processes.

SUMMARY OF THE INVENTION

The present invention is embodied in a process for recovering a high-purity saline mineral from an ore containing the saline mineral, such as trona, and impurities. The process generally includes separating a first portion of impurities from the trona by an electrostatic separation method at a temperature between about 25° C. and about 45° C. More preferably, the electrostatic separation is conducted at a temperature between about 30° C. and about 40° C., and even more preferably is conducted at a temperature of about 35° C.

In one aspect, the weight recovery of trona electrostatically separated from a feedstream containing trona and impurities according to the present invention is at least about 75%. In another aspect, the amount of iron impurities removed from a feedstream containing trona and impurities by conducting electrostatic separation according to the present invention is at least about 80%. In yet another aspect, the efficiency of iron impurities removal and trona recovery from a feedstream containing trona and impurities according to the present invention is at least about 65%.

In one aspect, the process includes separating a second portion of impurities from the trona by a density separation method which may occur before or after electrostatic separation of the first portion of impurities from the trona at a temperature between about 25° C. and about 45° C. The density separation step can include air tabling or dry jigging to separate impurities having a different density than the trona. The second portion of impurities removed by the density separation step may comprise shortite. In a preferred embodiment, the density separation step occurs after electrostatic separation.

In another aspect of the present invention, the process includes separating a second portion of impurities by a magnetic separation step. The magnetic separation step may occur before or after the step of electrostatic separation at a temperature between about 25° C. and about 45° C. In a preferred embodiment, the magnetic separation step occurs before electrostatic separation.

In yet another aspect of the invention, a process is provided for the beneficiation of trona from a feedstream of trona having impurities. The process generally includes the steps of sizing the feedstream of trona into a first size fraction and a second size fraction, separating the first size fraction into a first recovered portion and a first impurity portion by electrostatic separation at a temperature of between about 25° C. and about 45° C., and separating the second size fraction into a second recovered portion and a second impurity portion by a wet separation method. In a preferred embodiment, the electrostatic separation of the first size fraction is conducted at a temperature between about 30° C. and about 40° C., and more preferably at a temperature of about 35° C. The process may further include calcining the trona to form sodium carbonate, the calcining step occurring after the electrostatic separation step.

In a preferred embodiment, the process includes separating a first portion of impurities by a magnetic separation step, subjecting the nonmagnetic portion recovered from the magnetic separation step to electrostatic separation at a temperature between about 25° C. and about 45° C., which separates the "dirty" trona from the "clean" trona. Thereafter, the "clean" trona may be calcined to produce sodium carbonate. The sodium carbonate may then be subjected to a density separation step.

DETAILED DESCRIPTION

Processes of the present invention are designed to recover saline minerals from naturally occurring ores to produce commercially valuable purified minerals. As used in the mineral processing industry, the term "saline mineral" refers generally to any mineral which occurs in evaporite deposits. Saline minerals that can be beneficiated by the present process include, without limitation, trona, borates, potash, sulfates, nitrates, sodium chloride, and preferably, trona.

The purity of saline minerals within an ore depends on the deposit location, as well as the area mined at a particular deposit. In addition, the mining technique used can significantly affect the purity of the minerals. For example, by selectively mining, higher purities of saline minerals can be achieved. Deposits of trona ore are located at several locations throughout the world, including Wyoming (Green River Formation), California (Searles Lake), Egypt, Kenya, Venezuela, Botswana, Tibet and Turkey (Beypazari Basin). For example, a sample of trona ore from Searles Lake has been found to have between about 50% and about 90% by weight (wt.8) trona and a sample taken from the Green River Formation in Wyoming has been found to have between about 80 and about 90 wt. % trona. The remaining 10 to 20 wt. % of the ore in the Green River Formation sample comprised impurities including shortite (1 to 5 wt. %) and halite, and the bulk of the remainder comprises shale consisting predominantly of dolomite, clay, quartz and kerogen, and traces of other impurities. Other samples of trona ore can include different percentages of trona and impurities, as well as include other impurities.

The present process is directed to processes for the beneficiation of saline minerals and, in particular, the beneficiation of trona. For purposes of discussion, preferred embodiments of the present invention will be discussed with reference to trona. However, it should be appreciated that the intended scope of the present invention includes processes for the beneficiation of saline minerals more generally.

The present process includes removing a first portion of impurities from a feedstream of trona having impurities by an electrostatic separation method. Electrostatic separation methods are based on subjecting the ore to conditions such that materials of different electrical conductivities separate from each other. For example, electrostatic separation can be used to separate trona from impurities having a higher electrical conductivity, such as shale, mudstone, or pyrite. It should be appreciated, however, that electrostatic separation could also be used to separate impurities that have a lower electrical conductivity than the saline mineral being recovered.

One embodiment of the present invention for beneficiation of trona having impurities includes the step of electrostatically separating a first portion of impurities from the trona which is at a temperature of between about 25° C. and about 45° C. It has been surprisingly found that by conducting electrostatic separations in this temperature range significant increases in efficiencies can be obtained. Any known electrostatic separation technique can be used for this step of the present invention, including differential electrification, as disclosed in U.S. Pat. No. 4,341,744, which is incorporated herein by reference in its entirety. As discussed in the above-identified patent, saline mineral ore particles are first differentially electrified and then separated into a recovered stream from an impurity stream by various electrostatic separation processes, including, conduction or conduction in conjunction with ion bombardment.

In one embodiment of the invention and as noted above, beneficiation of trona from a feedstream of trona having impurities is conducted by electrostatically separating a first portion of impurities from the trona at a temperature of between about 25° C. and about 45° C., more preferably at a temperature between about 30° C. and about 40° C., and most preferably, at about 35° C. To conduct electrostatic separation within the above temperature ranges, the feedstream of trona having impurities can be heated to the identified temperatures prior to and/or during separation. For example, the feedstream of trona may be heated to the desired temperature in a standard drying oven prior to differential electrification. Further, where the feedstream of trona is transferred from a feed bin to an electrostatic separator using a roll, both the feed bin and the roll may be heated during electrostatic separation. In addition, the ambient temperature during the separation can be maintained at a high enough temperature to meet the above-noted temperature requirements.

By practice of the present invention, it has been found that electrostatic separation at a temperature between about 25° C. and about 45° C. can remove at least about 30 wt. %, more preferably about 50 wt. %, and most preferably about 80 wt. % of the insoluble iron impurities from the feedstream of trona having impurities.

It has also been found that the trona weight recovery (weight of trona recovered/weight of trona in the feedstream) from the electrostatic separation at a temperature between about 25° C. and about 45° C. is between about 60% and about 95%, and more preferably, between about 70% and about 90%, and most preferably about 80%.

Further, it has been found that electrostatic separation at a temperature between about 25° C. and about 45° C. increases the efficiency of iron removal and trona recovery. The efficiency (in percent) may be quantitatively measured as follows: ((weight percent of iron assay of feedstream—weight percent of iron assay of recovered product)/weight percent of iron assay of feedstream)×percent of trona recovered×100. In a preferred embodiment of the present invention, conducting electrostatic separation at a temperature of about 35° C. resulted in a reduction of the iron ($Fe_2O_3$) assay by about 83% and the trona recovery was 80%, which equals an efficiency of about 65%.

The impurity stream from a first pass of an electrostatic separation process can go through a scavenger step to improve the overall recovery. The scavenger step recovers a trona-containing portion of the impurity stream from the first pass through electrostatic separation and combines it with the recovered stream to increase the overall yield of the electrostatic separation step or otherwise cycles it to other steps in the process. Furthermore, the recovered stream from the first pass of the electrostatic separation can go through one or more electrostatic cleaning steps to further remove impurities from the recovered stream and improve the purity of the final product.

In an alternative embodiment, a second portion of impurities may be separated from the feedstream of trona by a density separation step. Density separation methods are based on subjecting an ore to conditions such that materials of different densities physically separate from each other. Thereby, certain impurities having a different density than the desired trona can be separated. The density separation step of the present invention is most preferably a dry process, however, wet density separation processes, such as heavy media separation, can be used as well. In dry density separation processes, the need for processing in a saturated brine solution, solid/brine separation, and drying of the product is eliminated. Any known density separation technique could be used for this step of the present invention, including air tabling or dry jigging.

In one embodiment of the invention, the density or gravity separation step may occur after the electrostatic separation step. As discussed in U.S. patent application Ser. No. 08/066,871, filed May 25, 1993, now U.S. Pat. No. 5,470,554, density separation is conducted by subjecting an ore to conditions such that materials of different density separate from each other. The mineral stream having materials of varying densities is then separated by a first or rougher pass into a denser and a lighter stream, or into more than two streams of varying densities. Typically, in the case of beneficiating trona, trona is recovered in the lighter stream.

With regard to the beneficiation of trona, which has a density of 2.14, impurities that are removed during the density separation step of the present invention include shortite having a density of 2.6, dolomite having a density of 2.8–2.9, and pyrite having a density of 5.0. Each of these is separable from the trona ore because of differences in density from trona. By practice of the present invention, of the total amount of shortite, dolomite, pyrite and, if present, potentially valuable heavy minerals in the trona ore, the density separation step can remove at least about 10 wt. %, more preferably about 50 wt. %, and most preferably about 90 wt. % of the heavy impurity.

The present process may further include a magnetic separation step which subjects the ore to conditions such that materials of different magnetic susceptibility separate from each other into a recovered stream and an impurities stream. The magnetic separation step can be accomplished by any conventional technique, such as induced roll, cross-belt, or high intensity rare earth magnetic separation methods. Preferably, induced roll is used in the present invention for the finer fractions and high intensity rare earth magnets are used for the coarser fractions. With regard to the beneficiation of trona, typical impurities can be removed during the magnetic separation step include shale which has a higher magnetic susceptibility than trona. By practice of the present invention, the use of an induced roll magnetic separation technique can remove at least about 5 wt. %, more preferably about 50 wt. %, and most preferably about 90 wt. % of the shale from the material being treated by magnetic separation.

In a further embodiment of the present invention, the trona-containing ore or trona can be crushed to achieve liberation of impurities prior to the separation steps. The crushing step of the present invention can be accomplished by any conventional technique, including impact crushing (e.g., cage or hammer mills), jaw crushing, roll crushing, cone crushing, autogenous crushing or semi-autogenous crushing. Autogenous and semi-autogenous crushing are optional because the coarse particles of ore partially act as the crushing medium, thus requiring less cost in obtaining grinding media. Moreover, because trona is typically soft, these methods are suitable for use in the present process. In addition, these two crushing methods allow for the continuous removal of crushed material and high grade potentially saleable dust.

In general, crushing to smaller particle size achieves better liberation of impurities and thus, improve recovery. However, if the particle size after crushing is too fine, there may be adverse effects upon subsequent separation steps. In addition, over-crushing is not needed for many applications of the present invention and merely increases the cost associated with the crushing step. It has been found that acceptable liberation of the present process can be achieved by crushing the trona to less than about 6 mesh. Preferably, a minimum particle size of the trona prior to the electrostatic separation at a temperature between about 25° C. and about 45° C. is about 100 mesh.

In another embodiment of the present invention, trona is sized into size fractions prior to the separation steps. Each size fraction is subsequently processed separately. In general, the narrower the range of particle size within a fraction, the higher the efficiency of removal of impurities. On the other hand, a large number of fractions will increase the efficiency, but may increase the cost of the overall process. The use of between 3 and 10 fractions has been found to be acceptable. Preferably, the number of fractions is between 4 and 10, and more preferably, the number of fractions is 10. Any conventional sizing technique can be used for the present process, including screening or air classification. For dividing into 10 fractions, the fractions typically have the following particle size ranges: 6×8, 8×10, 10×14, 14×20, 20×28, 28×35, 35×48, 48×65, 65×100 and −100. The +100 mesh fractions may be processed by any dry process described herein and the −100 mesh may be processed by any wet method described herein, or sold without processing as they are enriched in the sizing process.

In yet another embodiment of the present invention, the trona is dried prior to the separation steps set forth above. The drying step removes surface moisture from the trona to better enable the trona to be separated. Drying can be accomplished by any conventional mineral drying technique, including rotary kiln, fluid bed or air drying. The ore can be dried to less than about 2%, and preferably to less than about 1% surface moisture content. During the drying process, it is preferred that the trona is not raised to such a temperature for such a period of time that it is calcined. In the case of trona, the drying temperature should remain below about 40° C. to avoid calcination.

In still another embodiment of the present invention, a de-dusting step is added to the basic beneficiation process to remove fines before the electrostatic separation step. De-dusting can be particularly important before electrostatic separation because the dust can otherwise interfere with the effective electrostatic separation. Such a de-dusting step can be conducted before, during or after one or more of the crushing, sizing and/or density separation steps. The fines produced during the processing of trona are relatively high purity trona and are useful in several industrial applications. For example, trona recovered by de-dusting can have a purity of greater than about 94%, preferably greater than about 96% and preferably greater than about 98%. Pines can be collected in de-dusting steps by use of a baghouse, or other conventional filtering device, and sold as purified trona without further processing.

In various embodiments of the present invention, combination dry and wet processes for the production of trona are provided. The dry processes can include any known or hereafter developed processes for the dry beneficiation of ores containing trona. Such processes can include density separation, magnetic separation, and/or electrostatic separation at a temperature between about 25° C. and about 45° C. The wet processes can include any process which includes dissolution and crystallization, such as those disclosed in commonly assigned U.S. patent application Ser. No. 08/373,955, filed Jan. 17, 1995, pending, and U.S. patent application Ser. No. 08/544,135, filed Oct. 17, 1995, pending, both of which are incorporated by reference in their entirety herein.

A wet separation method of the various embodiments of the present invention includes a dissolution and crystallization process. Such a process takes advantage of the fact that the solubilization and crystallization of saline minerals results in more pure crystals because impurities are excluded as crystals are formed after solubilization. In accordance with the wet separation processes of the present invention, the product recovered thereby is highly pure and can contain greater than about 97% weight (weight percentage) soluble material, more preferably greater than about 98 wt. % soluble material and most preferably greater than about 99 wt. % soluble material. Further, such product has less than about 0.05 wt. % iron. More preferably, the iron content is at most about 0.02 wt. % and even more preferably at most about 0.01 wt. %.

In one embodiment of the dissolution and crystallization process, saline mineral crystals are dissolved in water or an unsaturated saline solution. For example, in the case of trona, trona (the sesquicarbonate form of sodium carbonate) or anhydrous sodium carbonate (calcined trona) can be dissolved. Once in solution, water is driven off, and the saline mineral crystallizes. For example, the water can be driven off by heating the solution. However, such a process can be expensive and time-consuming due to the energy required to heat the water and the amount of time required to fully dry the crystals.

In another method to perform dissolution crystallization in the instance of trona, trona is first calcined to produce anhydrous sodium carbonate crystals which are added to a saturated sodium carbonate brine solution. As anhydrous crystals go into solution and recrystallize, they crystalize in the monohydrate form if the temperature is between about 35° C. and about 112° C. Accordingly, there is a continuous crystallization process which tends to significantly reduce the impurities in the crystals. Crystals can then be recovered from the brine solution. A specific example of this process is disclosed in U.S. Pat. No. 2,887,360 issued May 19, 1959 (Hoekje).

In yet another embodiment of the combination wet and dry process of the present invention, a process for the production of trona from a feedstream having impurities is provided. The process includes the steps of separating a first portion of a feedstream of trona into a first recovered portion and a first impurity portion by a dry separation method, and separating a second portion of the feedstream of trona into a second recovered portion and second impurity portion by a wet separation method. The second portion may comprise particles having a particle size larger than about 100 mesh and more preferably, larger than about 65 mesh. The dry separation method is selected from the group consisting of density separation, magnetic separation, electrostatic separation processes as described herein, and combinations thereof. In addition, the wet separation method can be a dissolution and crystallization process. In the instance of trona, this embodiment can further include the step of calcining the trona to form sodium carbonate.

In another embodiment of the combination of the wet and dry process of the present invention, the process for the production of saline mineral from a feedstream having impurities is provided. This embodiment includes the steps of separating a first portion of impurities by a dry separation method, and separating a second portion of impurities by a wet separation method, wherein at least about 15 wt. % of said feedstream is processed by said wet separation method. The dry separation method is selected from the group consisting of density separation, magnetic separation, electrostatic separation processes as described herein, and combinations thereof. In addition, the wet separation method includes a dissolution and crystallization process. Preferably, the weight percent process by said wet separation process is at least about 20%, and more preferably at least about 30%. In the instance of trona, this embodiment can further include the step of calcining the trona to form sodium carbonate.

EXAMPLES 1–13

Thirteen splits of trona-containing ore were beneficiated in accordance with the present invention by electrostatic separation of impurities (e.g., $Fe_2O_3$) from trona at various temperatures between 15° C. and 75° C. More specifically, electrostatic separation of impurities from trona was conducted at 15° C., 25° C., 35° C., 45° C., 55° C., 65° C., and 75° C. With regard to the samples tested, the shale and some of the trona high in impurities were removed from approximately 200 lbs of 28×35 mesh trona ore by a single pass on an Eriez rare earth magnet. This separation was run under conditions that minimized trona losses into the magnetic product. The non-magnetic product was blended in a "V" blender and split with a riffle splitter into charges to be used in the electrostatic separation tests.

The electrostatic separations were made utilizing a Carpco electrostatic separator having a 10-inch roll. To minimize the variables in the tests, the revolutions per minute were held constant at 100 rpm and the position of the top electrode was unchanged (full pinning). The effective voltage was evaluated visually and no benefit was observed in using less than the maximum attainable without arcing. Two different bottom electrodes were evaluated in the tests of splits 1–13, the first being a combination electrode consisting of a 1-inch aluminum rod with a nichrome wire suspended on one side, the other electrode being a very flattened hollow oval which provided a broad surface for lifting.

The trona splits were heated to the above-noted temperatures in a standard drying oven and, to minimize the cooling of these splits during separation, the feed bin and the electrostatic separator roll were heated to slightly higher than the desired temperature with a heat gun. Surface temperatures were measured with an infrared thermometer, and split temperatures were measured with a thermal couple. The calibration of the infrared thermometer and the thermocouple were checked using boiling water.

The data generated from the foregoing beneficiation process is shown in Tables 1–2. As can be seen from the Tables, the recovery of trona range from 80% in Example No. 3 to 87.7% in Example No. 4. In addition, the efficiency of the electrostatic separation process can be calculated based upon the following equation:

$$\frac{(\text{iron assay of feed} - \text{iron assay of product})}{\text{iron assay of feed}} \times \text{trona recovery} \times 100.$$

The results show that at 35° C., the iron assay was reduced by about 83% and the trona recovery was 80%, giving an efficiency of about 65%. In this regard, as shown in by the data in Table 1, in its place, the efficiency at 35° C. was much higher than for any other temperature. The next best temperature was 45° C. with an efficiency of about 40%.

TABLE 1

Summary of Test Conditions and Data from Electrostatic Separations on 28 × 35 Mesh Trona at Different Temperatures Test Conditions:

| | |
|---|---|
| Roll: | 10" Diameter, 100 RPM |
| Top Electrode: | Unchanged for all tests, combination electrode, full pinning position, 61 degrees, Wire 2" from roll |
| Bottom Electrode: | Type variable (see below), 27 degrees, center of support 3.25" from roll |
| Cond/Mid Splitter: | Variable (see below) |
| Mid/Non Cond Splitter: | Variable (see below) |

| Test | Temperature Degrees C. Feed | | Roll | | Splitters** | | Bottom Electrode*** | | Best Product (Based on Fe Assay)****** | | | |
|---|---|---|---|---|---|---|---|---|---|---|---|---|
| 95-5-4- | In | Out | Start | End | Cond/Mid | Mid/NC | Type | Position | Type | % Insol.* | % $Fe_2O_3$ | % Rec |
| 1 | 15 | 15 | 20 | 18 | 35 | 75+ | Combo**** | Full Pinning | Non Cond.@ | 4.29 | 0.082 | 1.6 |
| 2A | 25 | 25 | 20 | 22 | 35 | 75+ | Combo**** | Full Pinning | Non Cond.@ | No Separation Products Not Saved | | |
| 2 | 25 | 25 | 23 | 22 | 30 | 75 | Lifting***** | 45 Degrees | Non Cond. | 2.28 | 0.027 | 33.6 |
| 3A | 35 | 35 | 35 | 35 | 40 | 55 | Lifting***** | 45 Degrees | Non Cond. | No Separation Products Not Saved | | |
| 3 | 35 | 35 | 35 | 36 | 25 | 75 | Combo**** | Full Pinning | Non Cond. | 3.44 | 0.016 | 80.0 |
| 4 | 45 | 44 | 47 | 45 | 25 | 55 | Combo**** | Full Pinning | Non Cond. | 4.18 | 0.063 | 87.7 |
| 5 | 45 | 45 | 49 | 46 | 25 | 55 | Lifting***** | 45 Degrees | Non Cond. | 3.73 | 0.045 | 63.2 |
| 6 | 45 | 45 | 48 | 45 | 25 | 55 | Combo**** | ½ and ½ | Non Cond. | 4.80 | 0.035 | 70.9 |
| 7 | 55 | 54 | 59 | 55 | 25 | 40 | Combo**** | ½ and ½ | Non Cond. | 5.24 | 0.070 | 83.6 |
| 8 | 65 | 63 | 69 | 63 | 25 | 40 | Combo**** | ½ and ½ | Non Cond.@ | 12.55 | 0.064 | 1.3 |
| 9 | 65 | 63 | 69 | 62 | 35 | 75+ | Combo**** | ½ and ½ | Non Cond. | 4.10 | 0.045 | 52.5 |
| 10 | 75 | 72 | 80 | 65 | 45 | 75+ | Combo**** | ½ and ½ | Non Cond. | 11.63 | 0.052 | 6.5 |
| 11 | 75 | 72 | 80 | 65 | 30 | 75+ | Combo**** | Full Pinning | Non Cond. | 4.07 | 0.059 | 65.9 |
| Feed, Average from all tests | | | | | | | | | | 44.73 | 0.085 | |

*Assays are based on uncalcinated trona.

**The position of the splitters is indicated by markings on the handle, 0 is all the way left and flat, 50 is vertical, a "+" after the setting indicates that a 1" extender was added to the splitter blade.

***The top electrode was unchanged.

****Combo indicates combination electrode which is a 1" diameter bar with a nichrome wire mounted 1" from the rod.

*****Lifting electrode is the one piece, sort of oval shaped electrode.

******Excluding Midd, for samples marked @ the Mid was the lowest iron product.

TABLE 2

Summary of Data from Temperature an Electrostatic Separation of Trona
Feed: 28 × 35 Mesh SQ810 Screened in Pilot Plant, Rescreened with Sweco Screen

| Test #1 | Weight Dist., % of: | | Water Insoluble | | | Water Soluble | | | $Fe_2O_3$ | | |
|---|---|---|---|---|---|---|---|---|---|---|---|
| | Feed to | 28 × 35 | | Dist., % of: | | | Dist., % of: | | | Dist., % of | |
| Product | Step | Mesh | Assay, %* | ES Feed | Sample | Assay, %* | ES Feed | Sample | Assay, %* | ES Feed | Sample |
| Eriez Rare Earth Belt Separation on 20 × 28 Mesh SW810 | | | | | | | | | | | |
| Magnetic | 5.2 | 5.2 | | | | | | | | | |
| Non Mag. | 94.8 | 94.8 | | | | | | | | | |
| Feed Calc. | 100.0 | 100.0 | | | | | | | | | |
| Test # 95-5-4-1 | | | | | | | | | | | |
| Conductor | 12.5 | 11.9 | 5.44 | 16.3 | | 94.56 | 12.3 | | 0.135 | 20.5 | |
| Middling | 85.9 | 81.5 | 3.99 | 82.1 | | 96.01 | 86.1 | | 0.075 | 77.9 | |
| Non Cond. | 1.6 | 1.5 | 4.29 | 1.6 | | 95.71 | 1.6 | | 0.082 | 1.6 | |
| NC + Midd | 87.5 | 83.0 | 4.00 | 83.7 | | 96.00 | 87.7 | | 0.075 | 79.5 | |
| Feed Calc. | 100.0 | 94.8 | 4.18 | 100.00 | | 95.82 | 100.0 | | 0.082 | 100.0 | |
| Test # 95-4-2A | | | | | | | | | | | |

TABLE 2-continued

Summary of Data from Temperature an Electrostatic Separation of Trona
Feed: 28 × 35 Mesh SQ810 Screened in Pilot Plant, Rescreened with Sweco Screen

| | Weight Dist., % of: | | Water Insoluble | | | Water Soluble | | | $Fe_2O_3$ | | |
|---|---|---|---|---|---|---|---|---|---|---|---|
| Test #1 | Feed to | 28 × 35 | | Dist., % of: | | | Dist., % of: | | | Dist., % of | |
| Product | Step | Mesh | Assay, %* | ES Feed | Sample | Assay, %* | ES Feed | Sample | Assay, %* | ES Feed | Sample |
| Conductor | 0.0 | 0.0 | Everything going to non conductor, products not saved | | | | | | | | |
| Middling | 0.8 | 0.8 | | | | | | | | | |
| Non Cond. | 99.2 | 94.0 | | | | | | | | | |
| Feed Calc. | 100.00 | 94.8 | | | | | | | | | |
| Test # 95-5-4-2 | | | | | | | | | | | |
| Conductor | 3.8 | 3.6 | 14.03 | 11.9 | | 85.97 | 3.5 | | 0.550 | 24.4 | |
| Middling | 63.3 | 60.0 | 5.10 | 71.5 | | 94.90 | 62.9 | | 0.090 | 65.5 | |
| Non Cond. | 32.9 | 31.2 | 2.28 | 16.6 | | 97.72 | 33.6 | | 0.027 | 10.2 | |
| NC + Midd | 96.2 | 91.2 | 4.14 | 88.1 | | 95.86 | 96.5 | | 0.068 | 75.6 | |
| ca | | | | | | | | | | | |
| Feed Calc. | 100.0 | 94.8 | 4.52 | 100.0 | | 95.48 | 100.0 | | 0.087 | 100.0 | |
| Test # 95-5-4-3A | | | | | | | | | | | |
| Conductor | 4.9 | 4.7 | Everything going to middling and conductor, products not saved | | | | | | | | |
| Middling | 81.2 | 77.0 | | | | | | | | | |
| Non Cond. | 13.9 | 13.2 | | | | | | | | | |
| Feed Calc. | 100.0 | 94.8 | | | | | | | | | |
| Test # 95-5-4-3 | | | | | | | | | | | |
| Conductor | 4.1 | 3.9 | 14.27 | 12.7 | | 85.73 | 3.7 | | 0.491 | 34.2 | |
| Middling | 16.9 | 16.0 | 7.84 | 28.6 | | 92.16 | 16.3 | | 0.162 | 46.1 | |
| Non Cond. | 79.0 | 74.9 | 3.44 | 58.7 | | 96.56 | 80.0 | | 0.015 | 19.7 | |
| Feed Calc. | 100.0 | 94.8 | 4.63 | 100.0 | | 95.37 | 100.0 | | 0.059 | 100.0 | |
| Test # 95-5-4-4 | | | | | | | | | | | |
| Conductor | 1.0 | 0.9 | 15.01 | 3.1 | | 84.99 | 0.9 | | 0.660 | 7.4 | |
| Middling | 11.9 | 11.3 | 8.43 | 20.9 | | 91.57 | 11.4 | | 0.223 | 30.3 | |
| Non Cond. | 87.1 | 82.6 | 4.18 | 76.0 | | 95.82 | 87.7 | | 0.063 | 62.3 | |
| Feed Calc. | 100.0 | 94.8 | 4.79 | 100.0 | | 95.21 | 100.0 | | 0.088 | 100.0 | |
| Test # 95-5-4-5 | | | | | | | | | | | |
| Conductor | 9.8 | 9.3 | 9.78 | 20.8 | | 90.22 | 9.3 | | 0.300 | 34.0 | |
| Middling | 27.6 | 26.2 | 4.85 | 28.9 | | 95.15 | 27.5 | | 0.106 | 33.5 | |
| Non Cond. | 62.6 | 59.4 | 3.73 | 50.4 | | 96.27 | 63.2 | | 0.045 | 32.5 | |
| Feed Calc. | 100.0 | 94.8 | 4.63 | 100.0 | | 95.37 | 100.0 | | 0.087 | 100.0 | |
| Test # 95-5-4-6 | | | | | | | | | | | |
| Conductor | 5.3 | 5.0 | 12.18 | 11.5 | | 87.82 | 4.9 | | 0.431 | 27.9 | |
| Middling | 24.4 | 23.2 | 6.65 | 28.8 | | 93.35 | 24.2 | | 0.141 | 41.9 | |
| Non Cond. | 70.3 | 66.6 | 4.80 | 59.7 | | 95.2 | 70.9 | | 0.035 | 30.2 | |
| Feed Calc. | 100.0 | 94.8 | 5.62 | 100.0 | | 94.38 | 100.0 | | 0.082 | 100.0 | |
| Test # 95-5-4-7 | | | | | | | | | | | |
| Conductor | 2.2 | 2.1 | 12.42 | 4.8 | | 87.58 | 2.0 | | 0.540 | 12.6 | |
| Middling | 14.5 | 13.8 | 6.80 | 17.6 | | 93.20 | 14.3 | | 0.165 | 25.4 | |
| Non Cond. | 83.3 | 79.0 | 5.24 | 77.6 | | 94.76 | 83.6 | | 0.070 | 62.1 | |
| Feed Calc. | 100.0 | 94.8 | 5.62 | 100.0 | | 94.38 | 100.0 | | 0.094 | 100.0 | |
| Test # 95-5-4-8 | | | | | | | | | | | |
| Conductor | 76.6 | 72.6 | 4.75 | 76.9 | | 95.25 | 76.6 | | 0.110 | 89.8 | |
| Middling | 22.0 | 20.8 | 4.13 | 19.2 | | 95.87 | 22.1 | | 0.039 | 9.2 | |
| Non Cond. | 1.5 | 1.4 | 12.55 | 3.9 | | 87.45 | 1.3 | | 0.064 | 1.0 | |
| Feed Calc. | 100.0 | 94.8 | 4.73 | 100.0 | | 95.27 | 100.0 | | 0.094 | 100.0 | |
| Test # 95-5-4-9 | | | | | | | | | | | |
| Conductor | 5.7 | 5.4 | 8.80 | 11.2 | | 91.20 | 5.5 | | 0.304 | 20.5 | |
| Middling | 42.0 | 39.8 | 4.42 | 41.2 | | 95.58 | 42.0 | | 0.104 | 51.7 | |
| Non Cond. | 52.3 | 49.6 | 4.10 | 47.6 | | 95.90 | 52.5 | | 0.045 | 27.8 | |
| Feed Calc. | 100.0 | 94.8 | 4.5 | 100.0 | | 95.5 | 100.0 | | 0.085 | 100.0 | |
| Test # 95-5-4-10 | | | | | | | | | | | |
| Conductor | 7.8 | 7.4 | 6.16 | 11.1 | | 93.84 | 7.7 | | 0.224 | 21.2 | |
| Middling | 85.1 | 80.7 | 3.55 | 69.8 | | 96.45 | 85.8 | | 0.072 | 74.3 | |
| Non Cond. | 7.1 | 6.7 | 11.63 | 19.1 | | 88.37 | 6.5 | | 0.052 | 4.4 | |
| Feed Calc. | 100.0 | 94.8 | 4.33 | 100.0 | | 95.67 | 100.0 | | 0.083 | 100.0 | |
| Test # 95-5-4-11 | | | | | | | | | | | |

TABLE 2-continued

Summary of Data from Temperature an Electrostatic Separation of Trona
Feed: 28 × 35 Mesh SQ810 Screened in Pilot Plant, Rescreened with Sweco Screen

| Test #1 | Weight Dist., % of: | | Water Insoluble | | | Water Soluble | | | $Fe_2O_3$ | | |
|---|---|---|---|---|---|---|---|---|---|---|---|
| | Feed to | 28 × 35 | | Dist., % of: | | | Dist., % of: | | | Dist., % of | |
| Product | Step | Mesh | Assay, %* | ES Feed | Sample | Assay, %* | ES Feed | Sample | Assay, %* | ES Feed | Sample |
| Conductor | 5.5 | 5.2 | 9.09 | 11.3 | | 90.91 | 5.2 | | 0.409 | 24.9 | |
| Middling | 28.9 | 27.4 | 4.43 | 28.8 | | 95.57 | 28.9 | | 0.103 | 32.8 | |
| Non Cond. | 65.6 | 62.2 | 4.07 | 60.0 | | 95.93 | 65.9 | | 0.059 | 42.4 | |
| Feed Calc. | 100.0 | 94.8 | 4.45 | 100.0 | | 95.55 | 100.0 | | 0.091 | 100.0 | |
| Average Feed | | | 4.73 | | | 95.27 | | | 0.085 | | |

*Note: Assays are based on uncalcined trona; they would be about 30% higher for calcined trona.

The foregoing description of the present invention has been presented for purposes of illustrating the description. Furthermore, the description is not intended to limit the invention to the form disclosed herein. Consequently, variations and modifications commensurate with the above teachings, and the skill or knowledge of the relevant art, are within the scope of the present invention. The embodiment described herein above is further intended to explain the best mode known for practice in the invention and to enable those skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for beneficiation of trona from a feedstream of trona having impurities comprising electrostatically separating a first portion of impurities from said trona, wherein said trona is maintained at a temperature of between about 25° C. and about 45° C. throughout said step of electrostatically separating.

2. A process, as claimed in claim 1, wherein said step of electrostatically separating is conducted at a temperature between about 30° C. and about 40° C.

3. A process, as claimed in claim 1, wherein said step of electrostatically separating is conducted at a temperature of about 35° C.

4. A process, as claimed in claim 1, further comprising separating a second portion of impurities from said trona by density separation.

5. A process, as claimed in claim 4, wherein said density separation step occurs after said electrostatically separating step.

6. A process, as claimed in claim 1, further comprising magnetically separating a second portion of impurities from said trona.

7. A process, as claimed in claim 6, wherein said magnetically separating step occurs before said electrostatically separating step.

8. A process, as claimed in claim 1, further comprising, before said electrostatically separating step, reducing a particle size of said trona to less than about 6 mesh.

9. A process, as claimed in claim 1, wherein said feedstream has a minimum particle size before said electrostatically separating step of about 100 mesh.

10. A process, as claimed in claim 1, further comprising, before said electrostatically separating step, sizing said trona into size fractions.

11. A process, as claimed in claim 1, further comprising, before said electrostatically separating step, drying said trona to remove surface moisture therefrom.

12. A process, as claimed in claim 1, further comprising, before said electrostatically separating step, de-dusting said trona to recover fines.

13. A process, as claimed in claim 1, further comprising calcining said trona to produce sodium carbonate.

14. A process, as claimed in claim 13, wherein said calcining step occurs after said electrostatically separating step.

15. A process, as claimed in claim 1, further comprising scavenging a recovered portion from said first portion of impurities; and recycling said recovered portion to said step electrostatically separating.

16. A process, as claimed in claim 1, further comprising calcining a portion of trona to form sodium carbonate; and separating a second portion of impurities from sodium carbonate by a wet separation method.

17. A process, as claimed in claim 1, wherein the weight recovery of said trona from said electrostatically separating step is about 80%.

18. A process, as claimed in claim 1, wherein the weight removal of iron impurities is at least about 50%.

19. A process, as claimed in claim 1, wherein the efficiency for removing iron impurities and recovering said trona is at least about 80%.

20. A process for beneficiation of trona from a feedstream of trona having impurities comprising:

(a) sizing said feedstream into a first size fraction and a second size fraction;

(b) separating said first size fraction into a first recovered portion and a first impurity portion by electrostatic separation, wherein said first size fraction is maintained at a temperature of between about 25° C. and about 45° C. throughout said step of electrostatic separation; and (c) separating said second size fraction into a second recovered portion and second impurity portion by a wet separation method.

21. A process, as claimed in claim 20, wherein said separating said first size fraction is at a temperature between about 30° C. and 40° C.

22. A process, as claimed in claim 20, wherein said separating said first size fraction is at a temperature of about 35° C.

23. A process, as claimed in claim 20, further comprising the step of calcining said trona to form sodium carbonate.

24. A process, as claimed in claim 23, wherein said calcining step occurs after said separating by electrostatic separation step.

25. A process, as claimed in claim 20, further comprising separating said first impurity portion into a third recovered portion and a third impurity portion by a wet separation method including a dissolution and crystallization process, and wherein at least about 15 weight percent of said feedstream is processed by said wet separation method.

26. A process, as claimed in claim 23, wherein said calcining step occurs before step (c), and wherein said wet separation step (c) comprises the steps of:

(i) converting said sodium carbonate to monohydrate crystals in a sodium carbonate brine solution; and (ii) separating at least a portion of said monohydrate crystals from insoluble impurities.

* * * * *